Sept. 7, 1965                    J. B. CAMP                    3,205,437
             EXTENSOMETER UTILIZING ROTATING MAGNETIC MEMORY WHEELS
Filed Aug. 30, 1960                                   3 Sheets-Sheet 3
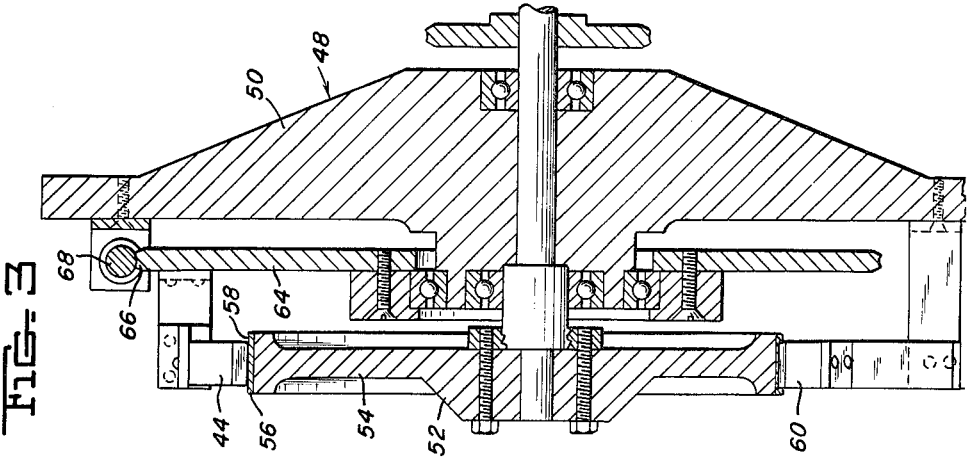
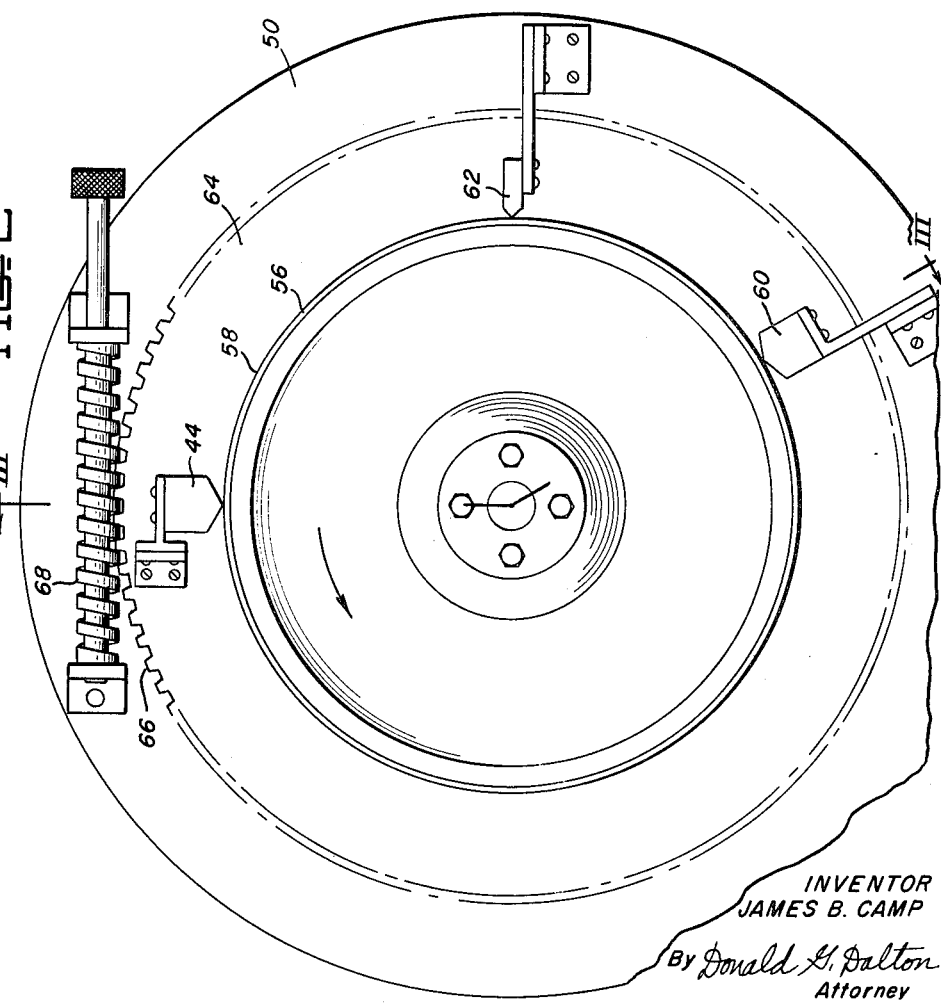
INVENTOR
JAMES B. CAMP
By Donald G. Dalton
Attorney United States Patent Office 3,205,437
Patented Sept. 7, 1965

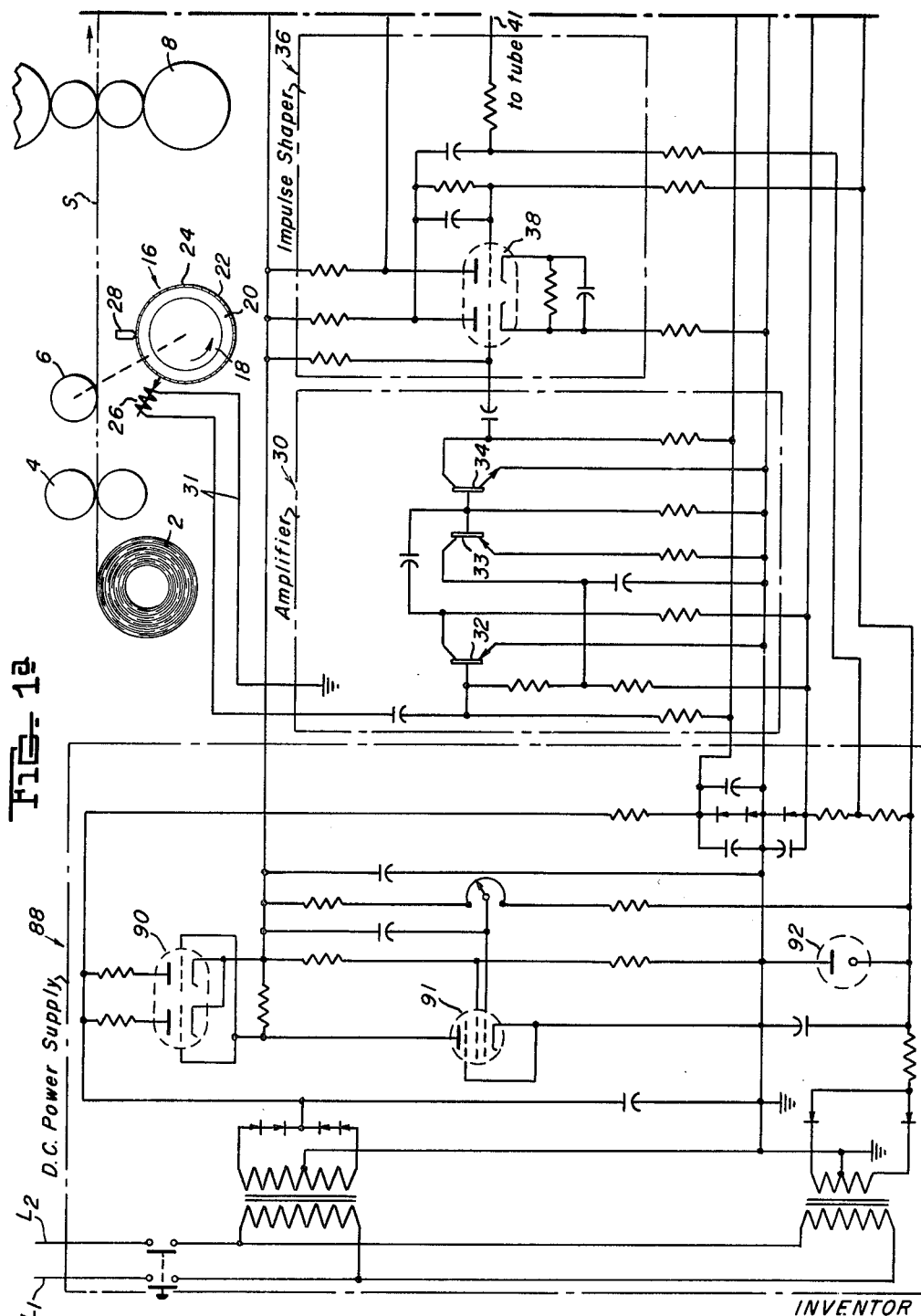

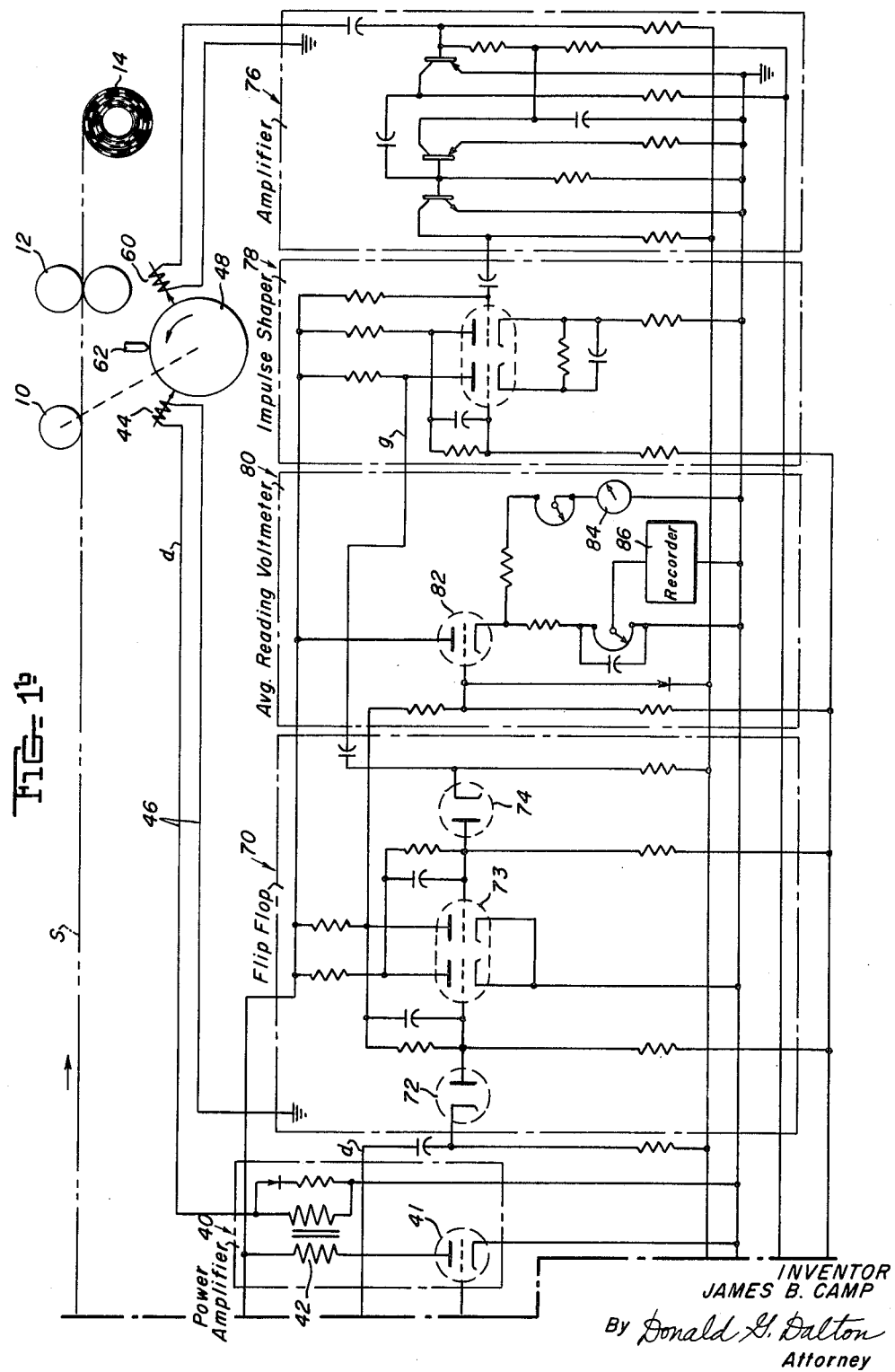

3,205,437
EXTENSOMETER UTILIZING ROTATING
MAGNETIC MEMORY WHEELS
James B. Camp, Fairfield, Ala., assignor to United States Steel Corporation, a corporation of New Jersey
Filed Aug. 30, 1960, Ser. No. 52,847
4 Claims. (Cl. 324—69)

This invention relates to apparatus for comparing the speed of two members and more particularly to an extensometer for determining the extension of a strip passing through a temper mill. There are many types of extensometers which may include pulse counters, differential selsyns, and null balance. However, all of the extensometers of which I have knowledge have various drawbacks. The readout may not be continuous, the actual percent elongation may not be indicated and/or it may not be sufficiently accurate.

It is therefore an object of my invention to provide an extensometer which measures and indicates actual percent elongation accurately and continuously.

Another object is to provide apparatus for accurately and continuously comparing the speed of two members.

These and other objects will be more apparent after referring to the following specification and attached drawings, in which:

FIGURES 1a and 1b together show a schematic view of the extensometer of my invention as applied to a temper rolling mill;

FIGURE 2 is a detail view of a memory device used in my invention; and

FIGURE 3 is a view taken on the line III—III of FIGURE 2.

Referring more particularly to the drawings reference numeral 2 indicates an uncoiler from which strip S passes through pinch rolls 4 under a first measuring roll 6 to a roll stand 8. From the roll stand 8 the strip passes under a second measuring roll 10 through pinch rolls 12 to a recoiler 14. The measuring rolls 6 and 10 are of equal diameter with the measuring roll 6 being mechanically connected to drive an impulse generator 16. While various types of impulse generators may be used, the one shown has proved to be particularly satisfactory. It consists of a cast aluminum wheel 18, a brass rim 20 secured thereto, and a magnetic alloy coating 22 on the brass rim. A plurality of equally spaced transverse spaced apart slots 24 are provided in the magnetic coating 22 parallel to the axis of the wheel. The magnetic alloy coating is preferably about .005 inch thick with the slots 24 extending entirely therethrough. The slots 24 are very narrow, for example .003 inch, in order to give a sharp pulse. A non-contacting recording head 26 is mounted adjacent the rim of the wheel and produces an impulse each time a slot 24 passes thereunder. An eraser or biasing magnet 28 is mounted adjacent the rim of the wheel on the entry side of the recording head 26 which is connected to an amplifier and automatic gain control 30 by means of leads 31. The amplifier and automatic gain control may be of any suitable standard type and, as shown, includes three transistors 32, 33 and 34, along with the usual capacitors and resistors.

The output of amplifier 30 is connected to an impulse shaper 36 which may be of any standard type. As shown, it includes a tube 38, capacitors and resistors.

The output of impulse shaper 36 is connected to a power amplifier 40 which includes a tube 41, transformer 42, resistors, capacitors and a rectifier as shown. This also is a standard circuit.

The output of amplifier 40 is connected to a non-contacting recorder head 44 through leads 46. The recording head 44 is mounted adjacent the rim of a magnetic type memory device 48 which includes a stator 50. A wheel 52 is rotatably supported in stator 50 and is connected to be driven by roll 10. The construction of the wheel 52 is essentially the same as that of the wheel of the impulse generator 16, and has a cast aluminum portion 54 having a brass rim 56 mounted thereon, with a magnetic alloy coating 58 on the rim. This coating, unlike that of the wheel of the impulse generator, is continuous. A take-off 60 is mounted on the stator 50 adjacent the rim of the wheel 52. In like manner, an eraser 62 is mounted on the stator 50 on the exit side of the take-off 60. The put-on head 44 is mounted on a plate 64 rotatably supported by the stator 50. The periphery of the plate 64 is provided with teeth 66 for engagement by a worm 68 supported on the stator 50.

The impulse shaper 36 is also connected to a flip-flop 70 of standard type. As shown, this includes tubes 72, 73 and 74 and the usual resistors and capacitors. Other types of pulse displacement measuring devices may be substituted for the flip-flop.

The pick-up head 60 is connected to an amplifier and automatic gain control 76 which has the same construction as the amplifier and automatic gain control 30. The amplifier 76 is connected to an impulse shaper 78 which is of the same construction as impulse shaper 36. The output of impulse shaper 78 is connected to the flip-flop 70. The output of flip-flop 70 is connected to an average reading voltmeter 80 of standard type, which includes a tube 82, a readout meter 84, and a continuous recorder 86, along with the usual resistors, capacitor and rectifier. Power for the circuit is supplied from a conventional regulated D.C. power supply 88 which includes tubes 90, 91 and 92, along with the auxiliary components.

The operation of my device is as follows:

Assuming that the maximum reduction of the strip in the mill 8 is 4 percent, an impulse generator will be selected that has more than twenty-five slots 24 therein; for example, 28 slots. By means of the worm 68, the head 44 of magnetic memory device 48 is moved to a position so that the circumferential distance from the head 44 to the take-off 60 is equal to the distance between twenty-six of the slots 24 of impulse generator 16. The device is then operated with no extension on the strip S and the position of head 44 changed until the readout meter 84 indicates zero elongation. At this time there will be a 25 pulse space between put-on head 44 and take-off 60. If the diameter of rolls 6 and 10 are exactly equal, this distance will be exactly the same as the distance between twenty-six of the slots 24. If there is a variation in diameter of the rolls 6 and 10, the distance between put-on head 44 and take-off 60 will be slightly greater or less than the distance between twenty-six slots 24. Thus, the adjusting worm 68 can be used to compensate for slight differences in diameter of the rolls 6 and 10 so as to assure that there are 25 pulse spaces between the put-on head 44 and take-off head 60 with zero percent elongation.

During operation of the mill 8, pulses are fed from impulse generator 16 to amplifier 30 and hence to impulse shaper 36. The purpose of impulse shaper 36 is to provide a uniform leading edge to the pulse regardless of strip speed. From the impulse shaper 36, the pulse goes directly to the flip-flop 70 and also passes through power amplifier 40 to the put-on head 44. The purpose of the power amplifier 40 is to insure sufficient power to record the pulse on the memory wheel 52. When the pulse from impulse shaper 36 reaches the flip-flop 70, it turns off the flip-flop so that the input to the average reading voltmeter 80 is zero. The flip-flop remains off until a shaped and amplified pulse from take-off 60 reaches the flip-flop 70. At this time the input to voltmeter 80 will rise to its maximum and will remain at this level until an impulse direct from impulse shaper 36 is impressed on flip-flop 70. The foregoing is repeated continuously and the meter 84 is calibrated to indicate percent elongation.

Assuming that the mill is elongating the strip slightly less than 4 percent, shaped pulse $d$ from pulse shaper 36 arrives at flip-flop 70 slightly before pulse $g$ from pulse shaper 78. Therefore, flip-flop 70 essentially remains in the on position at all times. Thus, the average voltage on voltmeter 80 will be approximately the maximum voltage and the meter 84 will indicate slightly under 4 percent. Assuming that the mill 8 is elongating the strip 2 percent, the impulse $d$ will reach the flip-flop 70 one-half pulse space after impulse $g$. Thus, the voltage applied to voltmeter 80 will be maximum half the time and zero half the time, and the reading on meter 84 will be 2 percent.

The meter may also be set up to indicate any range of elongation. If only one pulse space is provided between put-on head 44 and take-off 60, the limits will be zero and 100 percent. If thirty-three pulse spaces are used, the limits will be zero and slightly over 3 percent. If fifty pulse spaces are used, the limits will be zero and 2 percent. The sensitivity and accuracy of the meter will increase as the limits of the range decrease. Thus, it will be seen that if the distance between head 44 and take-off 60 is equal to the distance between two slots 24 with no elongation, the flip-flop 70 will be comparing the space between pulses from impulse generator 16 with the elongating pulse from memory wheel 48. This variation in pulse spacing is amplified by allowing the pulse to remain on the memory wheel a number of pulse spaces which is equal to the gain desired. This amplification increases the accuracy at the expense of lowering the maximum percent of elongation which can be measured.

While one embodiment of my invention has been shown and described, it will be apparent that other adaptations and modifications may be made without departing from the scope of the following claims.

I claim:

1. An extensometer for measuring the extension in length of a strip passing through a rolling mill comprising a rotatable roll in contact with said strip on the entry side of the rolling mill, an impulse generator, means connecting said roll and impulse generator to drive the latter at a speed proportional to entry strip speed, a roll in contact with said strip on the exit side of the rolling mill, a rotatable magnetic memory wheel, means connecting said last named roll and memory wheel to rotate the latter at a speed proportional to exit strip speed, a pulse displacement measuring device, means impressing the pulses from said generator simultaneously on said magnetic memory wheel and on said pulse displacement measuring device, a pulse take-off mounted adjacent said magnetic memory wheel at a predetermined whole number of pulse spaces from the position that said pulses are impressed thereon, an eraser adjacent said magnetic memory wheel on the exit side of said take-off, means for impressing the pulses from said pulse take-off on said pulse displacement measuring device, and a readout device connected to the output of said pulse displacement measuring device.

2. An extensometer for measuring the extension in length of a strip passing through a rolling mill comprising a rotatable roll in contact with said strip on the entry side of the rolling mill, an impulse generator, means connecting said roll and impulse generator to drive the latter at a speed proportional to entry strip speed, a roll in contact with said strip on the exit side of the rolling mill, a rotatable magnetic memory wheel, means connecting said last named roll and memory wheel to rotate the latter at a speed proportional to exit strip speed, an impulse shaper connected to the output of said generator, a pulse displacement measuring device, means impressing the pulses from said impulse shaper simultaneously on said magnetic memory wheel and on said pulse displacement measuring device, a pulse take-off mounted adjacent said magnetic memory wheel at a predetermined whole number of pulse spaces from the position that said pulses are impressed thereon, an eraser adjacent said magnetic memory wheel on the exit side of said take-off, an impulse shaper connected to said take-off, means for impressing the pulses from said last named impulse shaper on said pulse displacement measuring device, and an average reading voltmeter connected to the output of said pulse displacement measuring device.

3. An extensometer for measuring the extension in length of a strip passing through a rolling mill comprising a rotatable roll in contact with said strip on the entry side of the rolling mill, an impulse generator, means connecting said roll and impulse generator to drive the latter at a speed proportional to entry strip speed, a roll in contact with said strip on the exit side of rolling mill, a rotatable magnetic memory wheel, means connecting said last named roll and memory wheel to rotate the latter at a speed proportional to exit strip speed, a flip-flop, means impressing the pulses from said impulse generator simultaneously on said magnetic memory wheel and on said flip-flop, a pulse take-off mounted adjacent said magnetic memory wheel at a predetermined whole number of pulse spaced from the position that said pulses are impressed thereon, an eraser adjacent said magnetic memory wheel on the exit side of said take-off, means for impressing the pulses from said take-off on said flip-flop, and an average reading voltmeter connected to the output of said flip-flop.

4. An extensometer for measuring the extension in length of a strip passing through a rolling mill comprising a rotatable roll in contact with said strip on the entry side of the rolling mill, an impulse generator, means connecting said roll and impulse generator to drive the latter at a speed proportional to entry strip speed, a roll in contact with said strip on the exit side of the rolling mill, a rotatable magnetic memory wheel, means connecting said last named roll and memory wheel to rotate the latter at a speed proportional to exit strip speed, an impulse shaper connected to the output of said generator, a flip-flop, means impressing the pulses from said impulse shaper simultaneously on said magnetic memory wheel and on said flip-flop, a pulse take-off mounted adjacent said magnetic memory wheel at a predetermined whole number of pulse spaces from the position that said pulses are impressed thereon, an eraser adjacent said magnetic memory wheel on the exit side of said take-off, means for amplifying the pulses from said take-off, an impulse shaper connected to the output of said amplifier, means for impressing the pulses from said last named impulse shaper on said flip-flop, and an average reading voltmeter connected to the output of said flip-flop.

References Cited by the Examiner

UNITED STATES PATENTS

| | | | |
|---|---|---|---|
| 2,051,018 | 8/36 | Umansky | 324—70 |
| 2,474,116 | 6/49 | Rendel | 340—268 |
| 2,603,688 | 7/52 | Cole et al. | 324—34 |
| 2,669,669 | 2/54 | Spaulding | 310—155 |
| 2,786,978 | 3/57 | Warner | 324—70 |
| 2,798,976 | 7/57 | Eckel et al. | 310—155 |
| 2,852,195 | 9/58 | Coleman et al. | 324—34 |
| 2,931,979 | 4/60 | Uphoff et al. | 324—69 |
| 2,954,520 | 9/60 | Barany | 324—69 |
| 2,989,690 | 6/61 | Cook | 324—69 |
| 3,015,062 | 12/61 | George et al. | 324—34 |
| 3,029,022 | 4/62 | Horvath et al. | 324—69 |

OTHER REFERENCES

"A Digital Flying Extensometer for Temper Rolling Mills" (N. S. Wells), AIEE Transactions, Part II, Applications and Industry, vol. 76, dated January 1958.

WALTER L. CARLSON, *Primary Examiner.*

FREDERICK M. STRADER, SAMUEL BERNSTEIN,
*Examiners.*